Nov. 8, 1938.     B. A. DIGGINS     2,135,801
OPHTHALMOSCOPE
Filed June 1, 1936
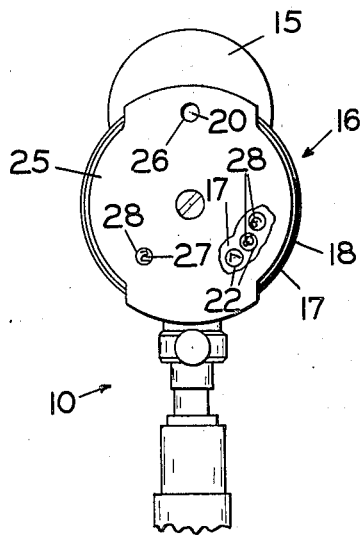
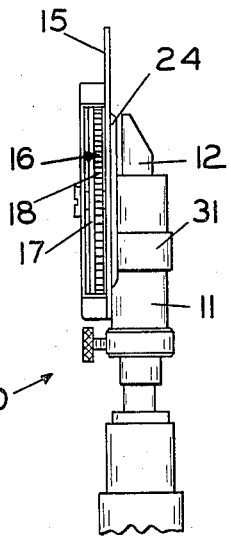
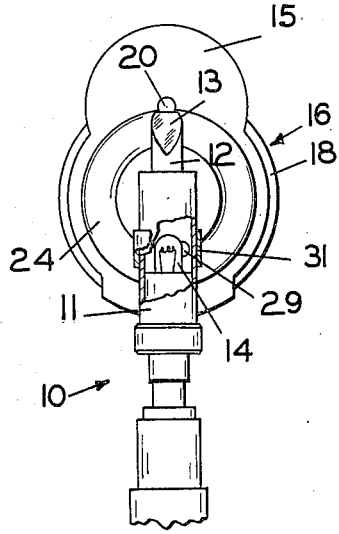
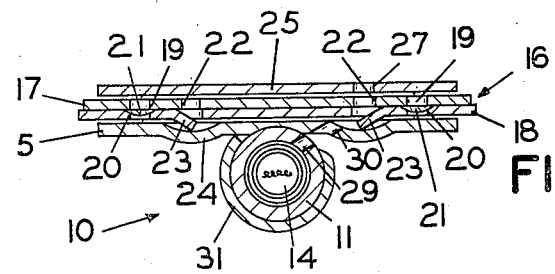
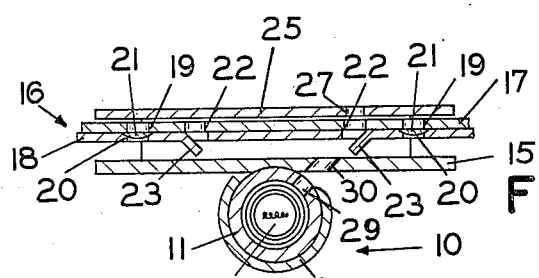
BARTHOLOMEW A. DIGGINS
INVENTOR
BY
ATTORNEYS Patented Nov. 8, 1938

2,135,801

UNITED STATES PATENT OFFICE 2,135,801

OPHTHALMOSCOPE

Bartholomew A. Diggins, Rochester, N. Y., assignor to Bausch & Lomb Optical Company, Rochester, N. Y., a corporation of New York Application June 1, 1936, Serial No. 82,795

4 Claims. (Cl. 88—22)

The present invention relates to optical instruments and more particularly to ophthalmoscopes which are used in darkened rooms for examining eyes.

One of the objects of the present invention is to provide an improved ophthalmoscope which will be relatively simple in structure yet convenient and efficient in operation. Another object is to provide an ophthalmoscope having means for illuminating its dial in a simple and efficient manner. A further object is to provide a new form of ophthalmoscope disk in which the indicia may be easily illuminated from the ophthalmoscope lamp. These and other objects and advantages reside in certain novel features of construction, arrangement and combination of parts as will hereinafter be more fully set forth and pointed out in the appended claims.

Referring to the drawing:

Fig. 1 is a front view with parts broken away, of an ophthalmoscope head embodying my invention.

Fig. 2 is a side elevation thereof.

Fig. 3 is a rear view thereof with parts broken away.

Fig. 4 is a horizontal section thereof.

Fig. 5 is a horizontal section of a modification.

One embodiment of the present invention is illustrated in Figs. 1 to 4 wherein 10 indicates, generally, an ophthalmoscope head which is of the well known May type. This ophthalmoscope head comprises a tubular housing 11 carrying a mounting 12 which holds the reflecting prism 13. An incandescent lamp 14 is mounted within the housing 11 and directs light rays onto the prism 13, from whence they pass to the eye of a patient, as is well known to those skilled in the art.

Secured to the housing 11 is a shield plate 15 upon which the lens carrying disk, indicated generally at 16, is rotatably mounted. In the preferred form, the disk 16 is composed of two substantially coextensive circular plates 17 and 18. These plates 17 and 18 have a series of aligned apertures 19 and 20, respectively, and the lenses 21 are positioned between the plates 17 and 18 in alignment with the apertures 19 and 20. The front plate 17 of the disk 16 has a second series of apertures 22 and the rear plate 18 has a series of rearwardly extending struck-up portions 23 in alignment with the apertures 22 for a purpose to be hereinafter described. In the embodiment shown in Figs. 1 to 4, the shield plate 15 has an annular depression 24 to provide clearance for the struck-up portions 23 as the disk 16 is rotated.

A cover plate 25 partially encloses the edge of the disk 16 so that the edge of the disk 16 may be engaged by the finger for the purpose of selectively rotating the disk to place any one of the series of lenses 21 in operative relation to the sight opening 26. A second opening 27 is formed in the cover plate 25 in alignment with the apertures 22. An index mark 28 is placed on each struck-up portion 23 and the particular index mark visible through the aperture 22 and opening 27 indicates the characteristics of the lens 21 in registry with the sight opening 26.

The tubular housing 11 has an opening 29 and an opening 30 is formed in the shield plate 15 in alignment with the opening 29 and the struck-up portion 23. From Fig. 4 it may be seen that light from the lamp 14 passes through the openings 29 and 30 to illuminate the index mark 28 on the struck-up portion 23. A shield or shutter 31 is mounted on the tubular housing 11 and may be rotated to close the opening 29 and thus cut off the light from the index mark 28.

In the modification shown in Fig. 5, the shield plate 15 is flat and the disk 16 is mounted in spaced relation to the shield plate 15 to provide clearance for the struck-up portions 23. The structure of the two modifications is otherwise the same.

From the foregoing, it will be apparent that I am able to attain the objects of my invention and provide an ophthalmoscope having a simple but effective means for illuminating the lens indicia from the ophthalmoscope lamp. While the ophthalmoscope lens disk has been shown as made of two plates, obviously a single plate could be used. Various other modifications could also be made without departing from the spirit of my invention or the scope of the appended claims.

I claim:

1. A lens carrier for an ophthalmoscope comprising a first disk having a series of apertures, a second disk having a series of apertures in alignment with the first-named series, a plurality of lenses secured between said disks in alignment with said apertures, said first disk having a second series of apertures, a series of portions in said second disk in alignment with said second series of apertures and bent away from said first disk, and indicia on the surface of said portions adjacent said first disk.

2. In an ophthalmoscope a housing, a lamp within said housing, means for directing light from said lamp into the eye of a patient, a lens disk rotatably carried by said housing, a plurality of lenses carried by said disk, a plurality of struck-up portions on the side of the disk adjacent said housing, indicia on said struck-up portions facing said disk in alignment with said openings, and means for illuminating said indicia from said lamp.

3. In an ophthalmoscope, a housing, a lamp within said housing, means for directing light from said lamp into the eye of a patient, a lens disk rotatably carried by said housing, a plurality of lenses carried by said lens disk, said disk having a plurality of apertures, one for each lens, a plurality of projections on the side of said disk adjacent said housing, indicia on said projections visible through said apertures and means for illuminating said indicia from said lamp.

4. An ophthalmoscope comprising a housing, a lamp mounted within the housing, means for directing light from the lamp to the eye of a patient, a lens disk rotatably mounted on said housing, a plurality of lenses carried by said disk, said disk having a plurality of apertures, one for each lens, projections on the surface of the disk and spaced from the plane thereof, said projections being located in alignment with said apertures, indicia on the surface of said projections visible through said apertures, and means for directing light from said lamp onto said indicia.

BARTHOLOMEW A. DIGGINS.